(12) United States Patent
Mattina et al.

(10) Patent No.: US 7,558,920 B2
(45) Date of Patent: Jul. 7, 2009

(54) APPARATUS AND METHOD FOR PARTITIONING A SHARED CACHE OF A CHIP MULTI-PROCESSOR

(75) Inventors: Matthew Mattina, Worcester, MA (US); Antonio Juan-Hormigo, Barcelona (ES); Joel Emer, Acton, MA (US); Ramon Matas-Navarro, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 10/882,048

(22) Filed: Jun. 30, 2004

(65) Prior Publication Data

US 2006/0004963 A1    Jan. 5, 2006

(51) Int. Cl.
*G06F 13/00* (2006.01)

(52) U.S. Cl. .................. 711/133; 711/147; 711/153

(58) Field of Classification Search .................. 711/130, 711/133, 147, 153
See application file for complete search history.

(56) References Cited

U.S. PATENT DOCUMENTS

| | | | |
|---|---|---|---|
| 5,584,014 | A | 12/1996 | Nayfeh et al. |
| 6,038,647 | A * | 3/2000 | Shimizu ............. 711/168 |
| 6,421,762 | B1 | 7/2002 | Arimilli et al. |
| 6,643,738 | B2 | 11/2003 | Timmer et al. |
| 6,668,307 | B1 | 12/2003 | Damron |
| 6,745,292 | B1 | 6/2004 | Stevens |
| 6,745,293 | B2 * | 6/2004 | Lasserre et al. ............. 711/131 |
| 6,748,479 | B2 * | 6/2004 | Sano et al. .............. 710/316 |
| 6,757,793 | B1 * | 6/2004 | Hughes et al. ............. 711/156 |
| 6,877,067 | B2 | 4/2005 | Yamazaki |
| 7,003,631 | B2 * | 2/2006 | Rowlands ............. 711/141 |
| 2001/0029574 | A1 * | 10/2001 | Razdan et al. ............. 711/130 |
| 2003/0023827 | A1 | 1/2003 | Palanca et al. |

FOREIGN PATENT DOCUMENTS

JP    2002373115    12/2002

OTHER PUBLICATIONS

Suh, G., et al., "Dynamic Cache Partitioning for Simultaneous Multithreading Systems", Proc. of IASTED Int'l Conf. on Parallel and Distributed Computing Syst., Aug. 2001.
Suh, G., et al., "Dynamic Partitioning of Shared Cache Memory", Journal of Supercomputing, Jul. 2002, pp. 1-23.
Liu, C., et al., "Organizing the Last Line of Defense before Hitting the Memory Wall for CMPs", Proc. of the High Perf. Computer Arch. Conf., Feb. 2004.

* cited by examiner

*Primary Examiner*—Reba I Elmore
(74) *Attorney, Agent, or Firm*—Blakely, Sokoloff, Taylor & Zafman LLP (57) ABSTRACT

A method and apparatus for partitioning a shared cache of a chip multi-processor are described. In one embodiment, the method includes a request of a cache block from system memory if a cache miss within a shared cache is detected according to a received request from a processor. Once the cache block is requested, a victim block within the shared cache is selected according to a processor identifier and a request type of the received request. In one embodiment, selection of the victim block according to a processor identifier and request type is based on a partition of a set-associative, shared cache to limit the selection of the victim block from a subset of available cache ways according to the cache partition. Other embodiments are described and claimed.

30 Claims, 7 Drawing Sheets

APPARATUS AND METHOD FOR PARTITIONING A SHARED CACHE OF A CHIP MULTI-PROCESSOR

FIELD OF THE INVENTION

One or more embodiments of the invention relate generally to the field of integrated circuit and computer system design. More particularly, one or more of the embodiments of the invention relates to a method and apparatus for partitioning a shared cache of a chip multi-processor.

BACKGROUND OF THE INVENTION

Chip multi-processors (CMPs) contain several processors on the same die. In a shared-cache CMP, some level of the cache is shared and is accessed by some or all of the processors on the chip. Often, this sharing is beneficial, because the processors are executing a multi-threaded software application in which the threads share data and instructions. By sharing the cache, a word of data that is accessed by more than one processor occupies a single location in the cache. Moreover, any processor can use all the cache if needed and allowed by the other processors. The downside of sharing the cache is that if the processors collectively require more capacity than available, they can experience more overall cache misses than if they had smaller private caches.

In a set-associative cache memory, a cache miss of requested data within the cache memory requires eviction of a block from the cache, referred to herein as the "victim block" to make room for the requested block. Accessing of the set-associative cache is performed according to an index of the cache request, which is used to select a set within the cache memory. Once the set is selected, a tag value of the cache request is used to identify a way within the selected set containing the requested cache block. When comparison of the tag value of the cache request fails to identify a corresponding way within the selected set, a cache miss is detected. In a shared cache, selection of the victim block to evict, in response to a cache miss, can become problematic depending on the number of processors which share the cache.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for partitioning a shared cache of a chip multi-processor (CMP) are described. In one embodiment, the method includes a request of a cache block from system memory if a cache miss within a shared cache is detected according to a received request from a processor. Once the cache block is requested, a victim block within the shared cache is selected according to a processor ID and a request type of the received request. In one embodiment, selection of the victim block according to a processor ID and request type is based on a partition of a set associative shared cache to limit the selection of the victim block from a subset of available cache ways according to the cache partition. In one embodiment, the subset of cache ways that can be used by either replacement algorithm can be different for different types of memory requests, for example, demand and prefetch requests.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

An example of "software" includes executable code in the form of an application, an applet, a routine or even a series of instructions. In one embodiment, an article of manufacture may include a machine or computer-readable medium having software stored thereon, which may be used to program a computer (or other electronic devices) to perform a process according to one embodiment. The computer or machine readable medium includes but is not limited to: a programmable electronic circuit, a semiconductor memory device inclusive of volatile memory (e.g., random access memory, etc.) and/or non-volatile memory (e.g., any type of read-only memory "ROM", flash memory), a floppy diskette, an optical disk (e.g., compact disk or digital video disk "DVD"), a hard drive disk, tape, or the like.

System

Figure 1:
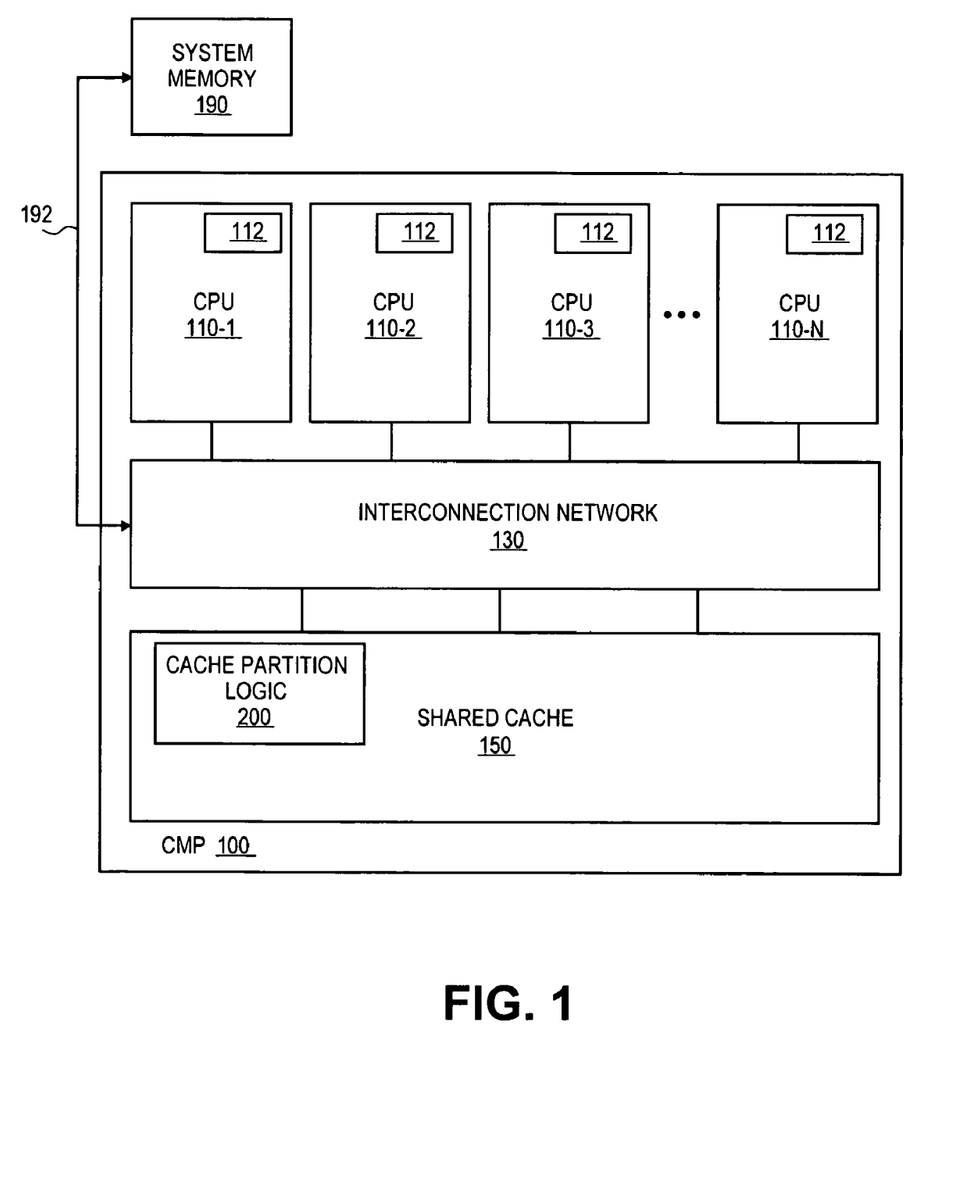
FIG. 1 is a block diagram illustrating a chip multi-processor (CMP) including a controller to provide partitioning of a shared cache, in accordance with one embodiment.

FIG. 1 is a block diagram illustrating a chip multi-processor (CMP) 100 including a shared cache 150 having cache partition logic 200 to partition shared cache 150 to restrict the selection of a victim block from a subset of available cache ways, in accordance with one embodiment. Representatively, CMP 100 contains a plurality of processor cores 110 (110-1, . . . , 110-N), which are fabricated on the same die. As illustrated, processor cores (CPU) 110 are coupled to interconnection network 130 to access shared cache 150. In one embodiment, each CPU 110 includes a private core cache hierarchy 112, which may be used for the temporary storage or caching of data.

In one embodiment, CPUs 110 access system memory 190 via system memory interconnect 192 coupled to interconnection network 130. In one embodiment, system memory 190 may include, but is not limited to, a double-sided memory package including memory modules comprised of random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data in each memory module.

Representatively, shared cache 150 is shared by CPUs 110 of CMP 100. Often, this sharing is beneficial because CPUs 110 are executing a multi-threaded software application in which the threads share data and instructions, thereby reducing storage requirements, as well as allowing a single CPU 110 to access the entire shared cache according to program requirements. Unfortunately, the downside of sharing cache 150 is that if CPUs 110 collectively require more capacity than is available from shared cache 150, CPUs 110 may experience more overall cache misses than if they had smaller private caches.

Accordingly, in one embodiment, shared cache 150 is partitioned by restricting which processors can allocate into which ways. In one embodiment, shared cache 150 is a set-associative shared cache, which is accessed according to a cache index of a memory request which identifies a set within shared cache 150. Based on the cache index, a tag value of the request is used to identify a way within the selected set that contains a requested block of data. However, if the requested block of data is not contained within the set ("cache miss"), a block of data is selected for eviction from shared cache 150, referred to herein as a "victim block," to make room for the requested block.

In one embodiment, each CPU 110 is allowed to hit on (use) data in any and all of the ways of shared cache 150, whether or not the CPU in question actually brought the data into the cache initially. However, when a cache controller (not shown) detects a cache miss and needs to evict a victim block from shared cache 150 to make room for the requested block, in one embodiment, cache partition logic 200 restricts the selection of the victim block from a subset of available cache ways according to the CPU 110 from which the memory request was received. In one embodiment, cache partition logic 200, as shown in FIG. 2, is implemented within the cache controller of shared cache 150.

Figure 2:
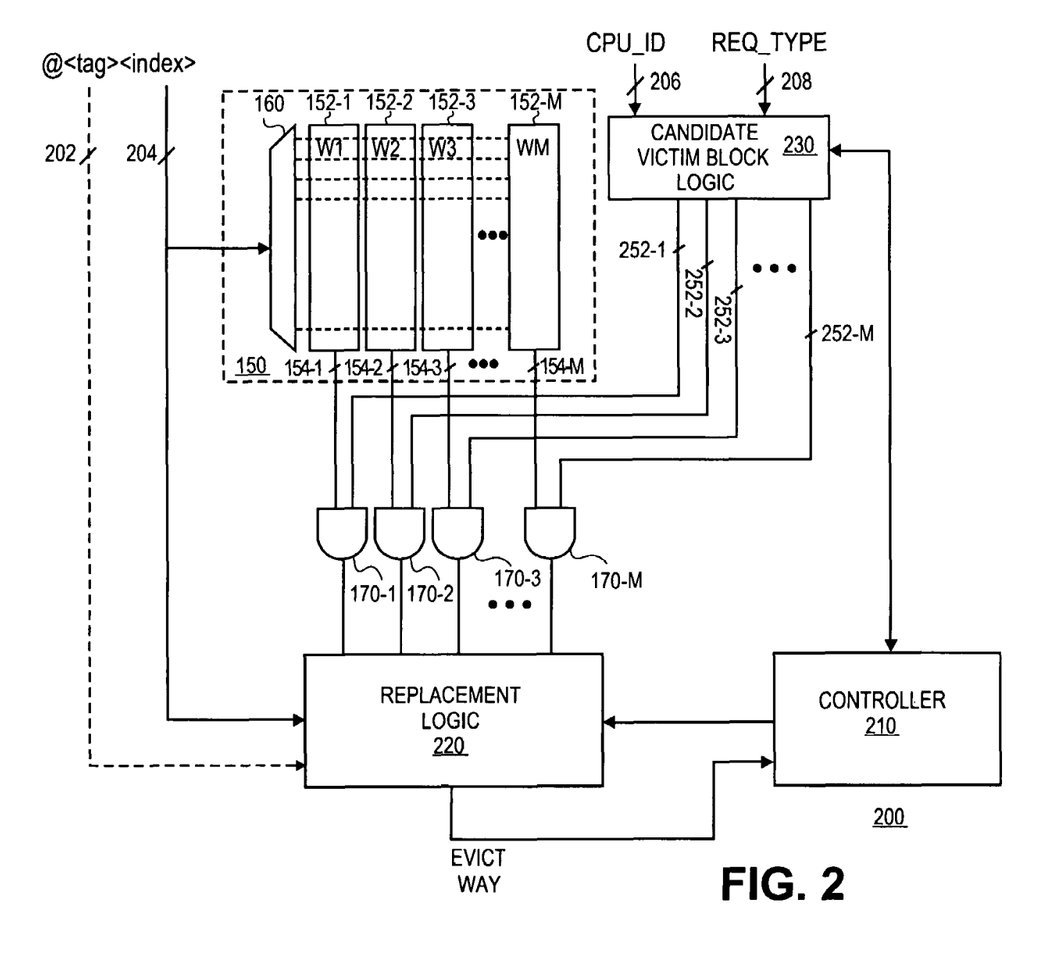
FIG. 2 is a block diagram further illustrating the shared cache and controller of FIG. 1 to provide cache partitioning of the shared cache, in accordance with one embodiment.

As illustrated in FIG. 2, in one embodiment, cache partition logic includes replacement logic 220, in conjunction with cache controller 210 and candidate victim block logic 230, to restrict the selection of a victim block to a subset of available cache ways according to a partition of shared cache 150. In one embodiment, the subset of cache ways that can be used by replacement logic 220 is altered for different types of memory requests, for example, demand and prefetch requests. Representatively, shared cache 150 may include M-ways (W1 152-1, W2 152-2, ..., WM 152-M). Accordingly, when a CPU 110 detects a cache miss within a respective private core cache 112, the CPU 110 may send a cache request to cache controller 210 of shared cache 150.

In one embodiment, index value 204 associated with the cache request is provided to decoder 160 to identify a set within shared cache 150. Once the set is identified, a tag value 202 associated with the cache request is compared to each of the M-ways 152 (152-1, ..., 152-M) of shared cache 150 to identify a way containing the requested cache block. However, if a cache miss is detected, in one embodiment, candidate victim block logic 230 and replacement logic 220 restrict cache controller 210 in selecting a victim block within the set identified by index 204.

Representatively, N-processors (CPUs 110-1, ..., 110-N) share the M-ways 152 of shared cache 150. In one embodiment, cache partition logic 200 may partition shared cache 150 according to the N-CPUs 110 and T-types of memory requests issued by CPUs 110. In one embodiment, N times T M-bit registers (way registers) labeled D[i][j] (where i is in the range [0 ... N−1] and j is in the range [0 ... T−1]). embodiment, each bit in a way register (indicated by d[i][j][b], where b is in the range [0 ... M−1]) indicates whether (1) or not (0) a CPU i can allocate into way b for a cache miss of a cache request of type j.

In one embodiment, the variable "i" refers to a processor identifier of the CPU that issued the cache request. As described herein, processor identifier is defined to mean any signal, data sequence or other mechanism by which one processor can be distinguished from another processor of CMP 100. In one embodiment, a hardware identifier is assigned to each processor, or CPU, 110 of CMP 100 as the processor identifier (CPU_ID). In an alternate embodiment, the processor identifier or CPU_ID is a serial number, or other numeric device identification means, to distinguish the respective processor from another processor within CMP 100.

As described herein, the term "processor identifier" is alternatively referred to as a requester identifier, which equates to a processor identifier when the requester is a processor of CMP 100. However, those skilled in the art will recognize that the cache partition scheme described herein is not limited to cache requests issued by processors and may include cache request issued by other devices of CMP 100, such as, for example, a memory controller issued cache request to shared cache 150, while falling within the scope of the claimed subject matter.

Figure 3:
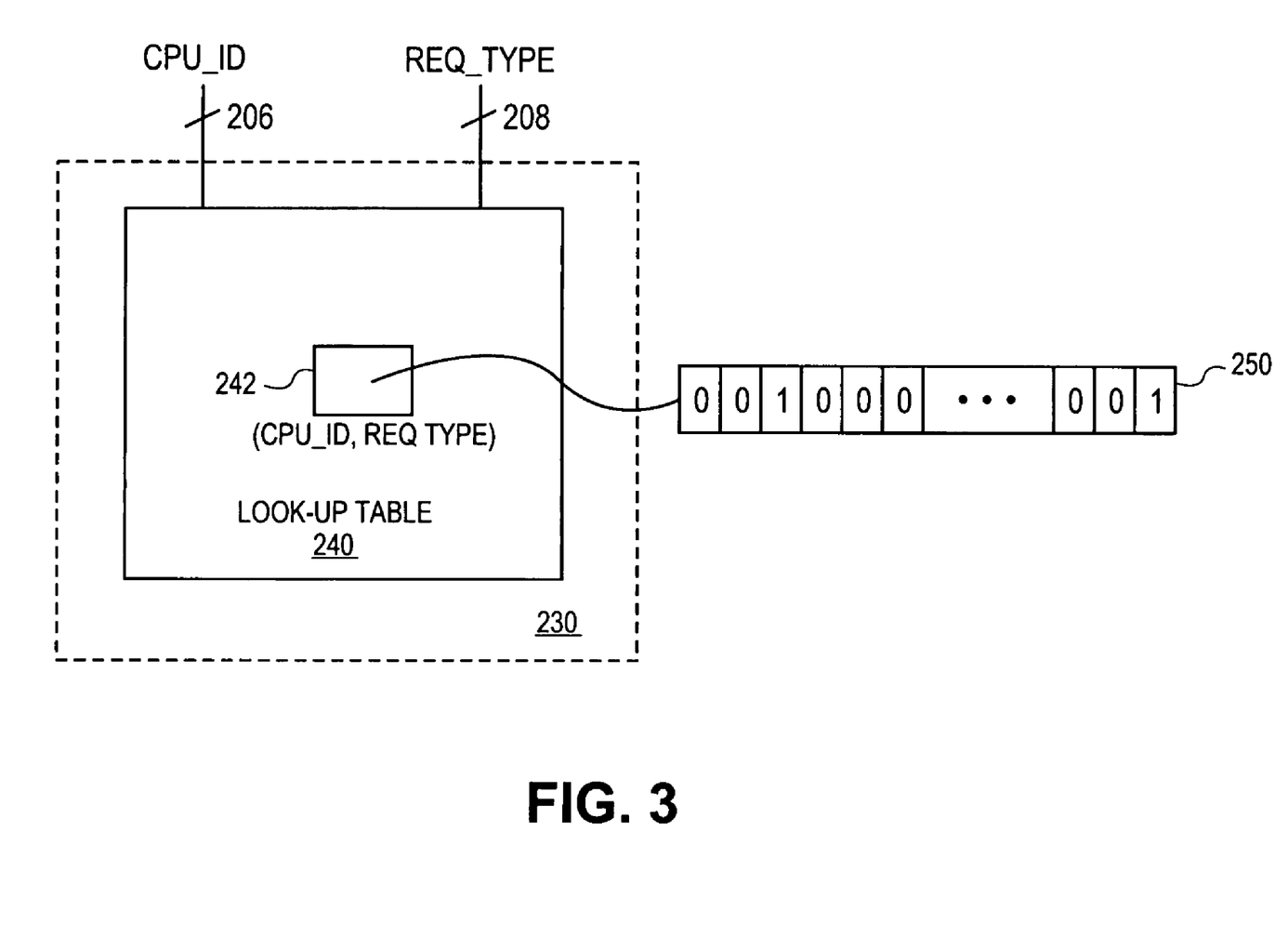
FIG. 3 is a block diagram further illustrating candidate victim block logic of FIG. 2, in accordance with one embodiment.

In one embodiment, implementation of way registers is provided, as illustrated with reference to FIG. 3. Representatively, a look-up table (d) 240 is indexed according to a processor identification (CPU_ID) 206 and a request type (REQ_TYPE) 208. Based on the two values, look-up table 240 identifies a location 242 that identifies a way register 250, also referred to herein as an "M-bit mask." In one embodiment, the M-bit mask directly corresponds to each of the M-ways 152 of shared cache 150.

Accordingly, referring again to FIG. 2, in one embodiment, M-bit way mask 250 is provided to logic gates 170 (170-1, ..., 170-M), which receive validity bits 154 (154-1, ..., 154-M) from shared cache 150. Once provided, replacement logic 220 can select a victim block at cache index 204 according to corresponding bits 252 (252-1, ..., 252-M) of M-bit way mask 250 which are set. Accordingly, when a CPU i misses in private core cache 112 on address a, CPU 110-i sends a request for block a to shared cache 150. In one embodiment, shared cache controller 210 checks if block a is present in shared cache 150.

If block a is present, the shared cache returns block a to processor i. However, if block a is not present, the shared cache will send a request for block a to system memory 190. In one embodiment, cache controller 210 is required to evict one of the M−1 blocks at cache index 204 to make room for requested block a. In one embodiment, selection of the victim block is performed by replacement logic 220 of cache partition logic 200 of shared cache 150.

In one embodiment, replacement logic selects the victim block by using the way register 250 (d[i][k]) for a memory request of type k for CPU 110-i. If bit b in register d[i][k] is set (d[i][k][b]=1), then way b is a candidate for eviction. In one embodiment, when there are multiple bits in register d[i][k] that are set, there are multiple choices for victim blocks to evict. In one embodiment, replacement logic 220 selects the least recently used way for eviction when there are multiple candidate victim blocks. Procedural methods for implementing one of more of the above-described embodiments are now provided.

Operation

Figure 4:
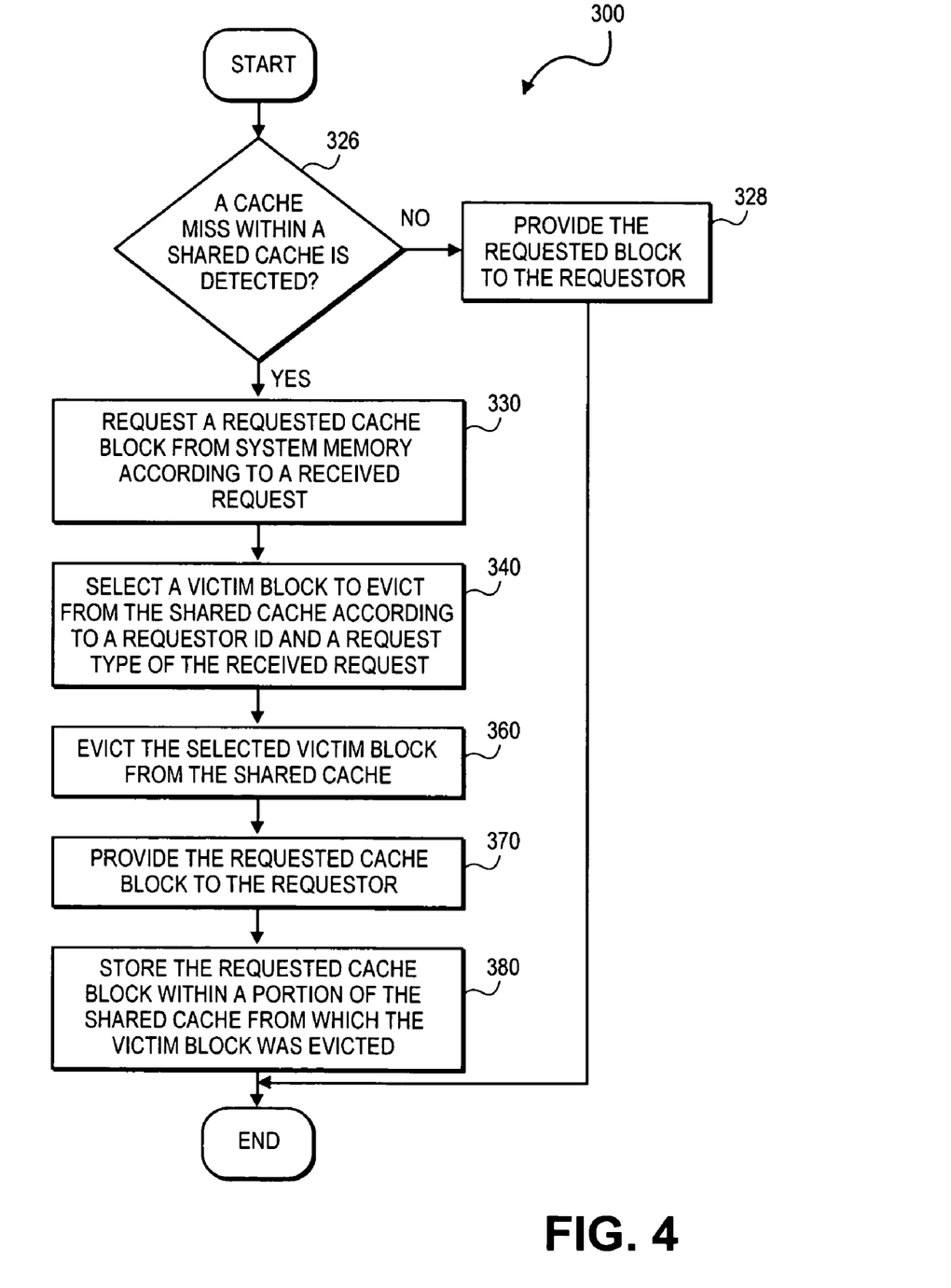
FIG. 4 is a flowchart illustrating a method for selecting a victim block within a shared cache according to a partitioning of the shared cache, in accordance with one embodiment.

FIG. 4 is a flowchart illustrating a method 300 for selecting a victim block from a partitioned-shared cache, for example, as illustrated in FIG. 2, in accordance with one embodiment. At process block 326, it is determined whether a cache miss within a shared cache is detected. If a cache miss is not detected ("cache hit"), at process block 328, a requested block is provided to a requester, such as a processor core or CPU of a chip multi-processor (CMP). Otherwise, at process block 330, a request is issued to system memory for the requested block according to a received request.

In one embodiment, at process block 340, a victim block is selected for eviction from the shared cache according to a requester ID and a request type of the received request. In one embodiment, selection of the victim block is performed by replacement logic 220, as shown in FIG. 2. At process block 360, the selected victim block is evicted from the shared cache, for example, by a cache controller. At process block 370, the requested cache block is provided to the requestor. At process block 380, the requested cache block is stored within a portion of the shared cache from which the victim block was evicted.

Figure 5:
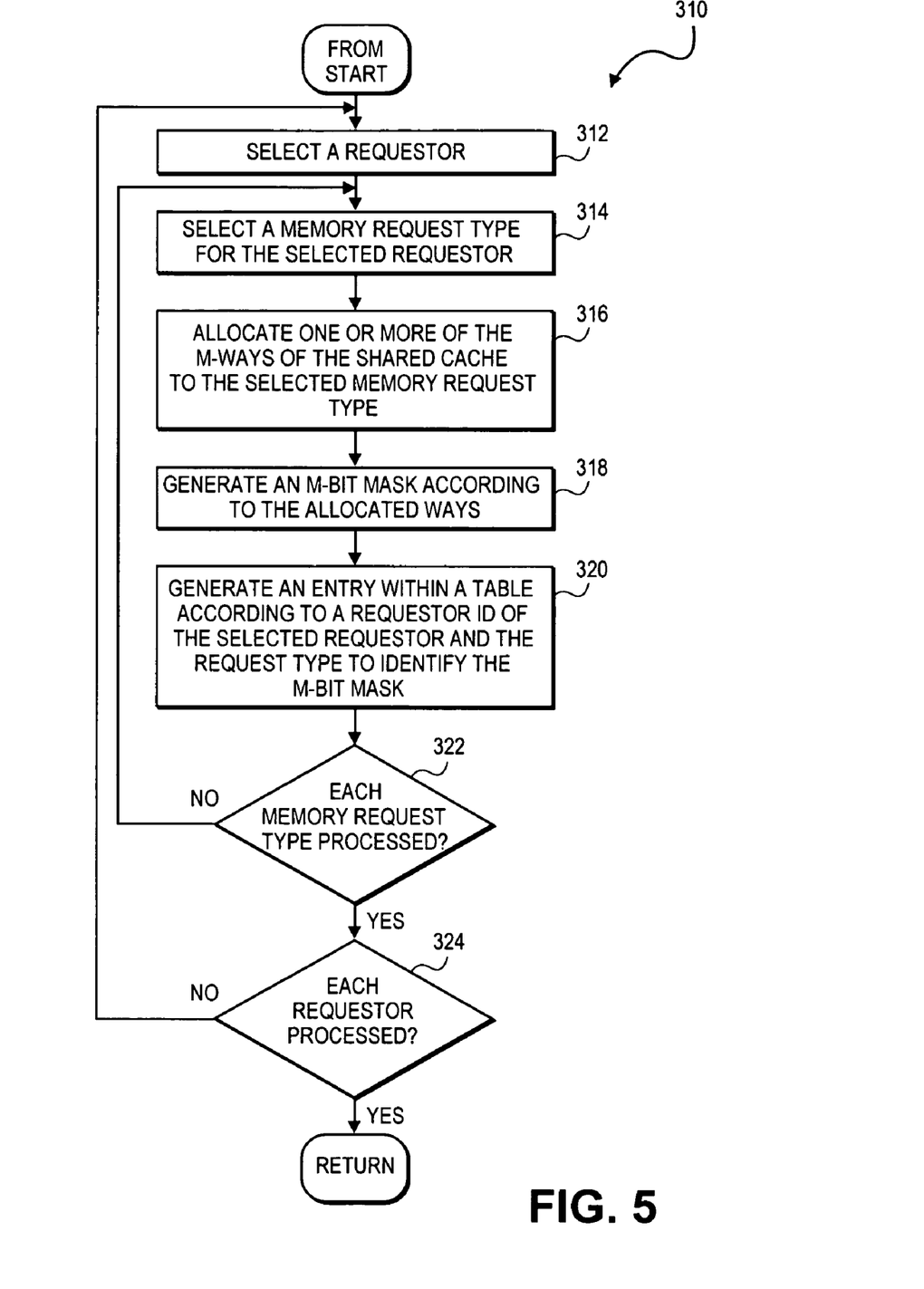
FIG. 5 is a flowchart illustrating a method for partitioning a shared cache of a chip multi-processor (CMP), in accordance with one embodiment.

FIG. 5 is a flowchart illustrating a method 310 for partitioning a shared cache to restrict selection of victim blocks, in accordance with one embodiment. At process block 312, a requester, such as a CPU of a CMP, is selected from a plurality of requestors that share a cache. At process block 314, a memory request type is selected for the selected requester. Once selected, at process block 316, one or more of the M-ways of the shared cache are allocated for the selected memory request type. In one embodiment, the memory request types may include, but are not limited to, load requests, store requests, data prefetching, data speculation, demand requests and the like.

In one embodiment, at process block 318, an M-bit mask is generated according to the allocated ways of process block 316. For example, as illustrated with reference to FIG. 3, the M-bit way mask, or way register 250, includes a bit field, which corresponds to each way within shared cache 150. Accordingly, when a victim block is selected for eviction at a set indicated by cache index 204, each set bit within M-bit way mask 250 identifies a potential victim block, which may be evicted to make room for the requested block of data.

Once the M-bit way mask or way register is generated, at process block 320, an entry is generated within a table according to a requestor identifier (e.g., CPU_ID) of the selected requestor and the request type to identify the M-bit way mask. In one embodiment, a table, for example, as illustrated in FIG. 3, is formed, which is indexed according to a CPU_ID 206 and a REQ_TYPE. At process block 322, process blocks 314-320 are repeated for each memory request type. At process block 324, process blocks 312-322 are repeated for each requester, such as each processor core of a chip multi-processor, which shares a shared cache.

Figure 6:
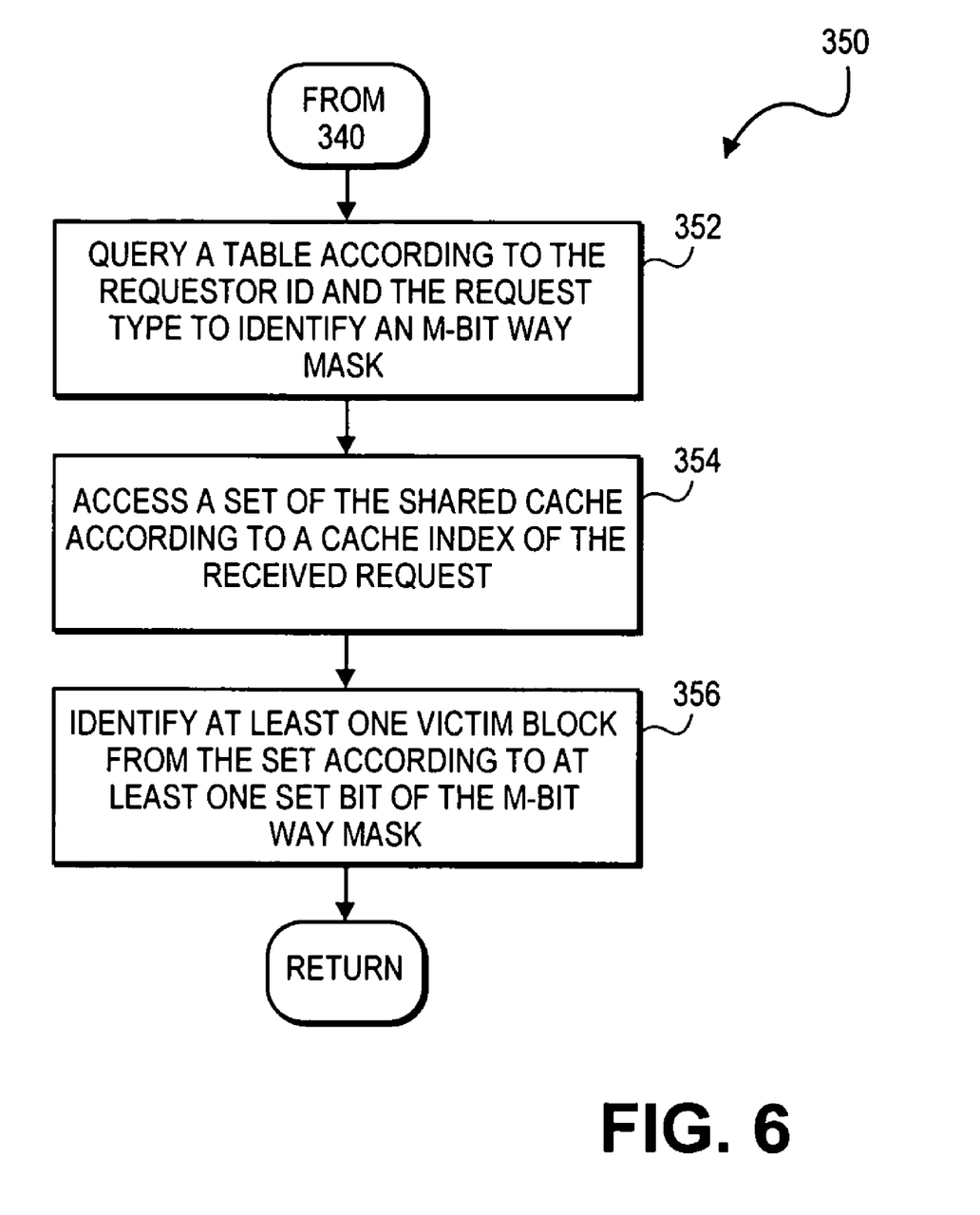
FIG. 6 is a flowchart illustrating a method for selecting a victim block according to a cache partitioning scheme of the shared cache, in accordance with one embodiment.

FIG. 6 is a flowchart illustrating a method 350 for selecting a victim block from a shared cache in response to a cache miss of a requested block within a shared cache, in accordance with one embodiment, for example, as illustrated with reference to FIG. 3. At process block 352, a table is queried according to a requestor and a request type to identify an M-bit way mask, which may be implemented within a register or other data storage device. At process block 354, a set of the shared cache is accessed according to a cache index of the received request, for example, as illustrated with reference to FIG. 2. At process block 356, at least one victim block for the set is identified according to at least one set bit of the M-bit way mask.

In other words, as described above, each set bit within the M-bit way mask identifies a candidate victim block at a set of the shared cache indicated by an index of the received request. In one embodiment, replacement logic 220 of FIG. 2 will select a least recently used way 152 when an M-bit mask 250 received from logic 230 includes multiple set bits. As described herein, the various signals may represent active high or active low signals. Accordingly, as described herein, the terms "assert", "asserting", "asserted", "set", "setting", "de-assert", "de-asserted", "de-asserting" or other like terms may refer to data signals, which are either active low or active high signals. Therefore, such terms, when associated with the signal, are interchangeably used to require or imply either active low or active high signals.

Although one or more of the above-described embodiments are illustrated with reference to a shared cache of a chip multi-processor, those skilled in the art will recognize that the embodiments described herein may be provided to other system configurations in which a cache is shared by one or more processors. Furthermore, partitioning of the cache according to memory requests and processor ID is provided as an example to implement the above-described embodiments. However, additional partitioning schemes of a shared cache to restrict selection of a victim block are also possible, while remaining within the scope of the above-described embodiments.

Figure 7:
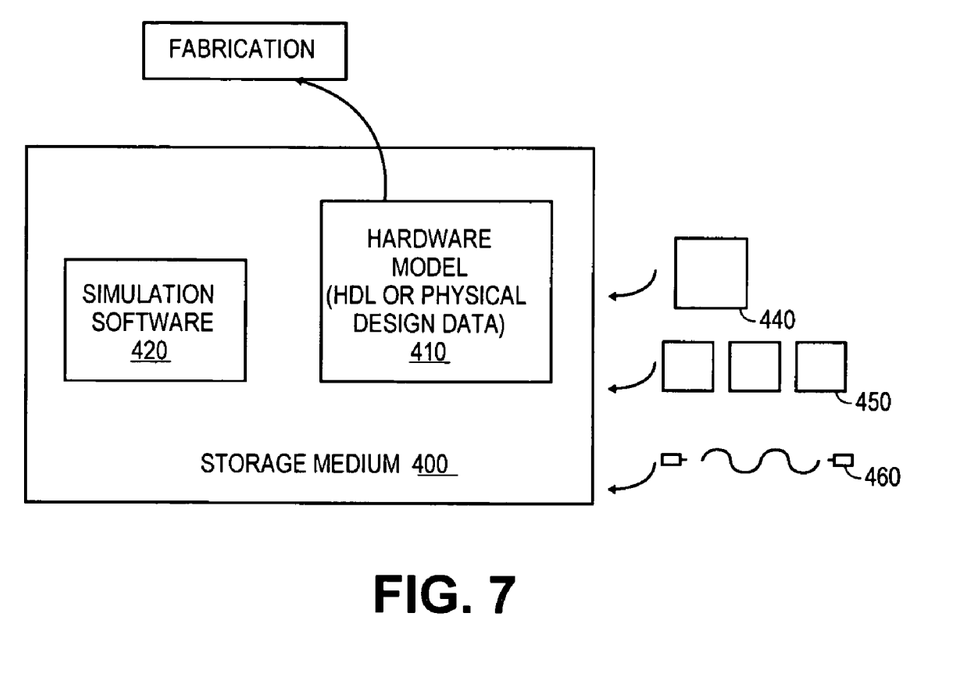
FIG. 7 is a block diagram illustrating various design representations or formats for emulation, simulation and fabrication of a design using the disclosed techniques.

FIG. 7 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 410 may be stored in a storage medium 400, such as a computer memory, so that the model may be simulated using simulation software 420 that applies a particular test suite 430 to the hardware model to determine if it indeed functions as intended. In some embodiments, the simulation software is not recorded, captured or contained in the medium.

In any representation of the design, the data may be stored in any form of a machine readable medium. An optical or electrical wave 460 modulated or otherwise generated to transport such information may be a machine readable transmission medium. A memory 450 or a magnetic or optical storage 440, such as a disk, may be a machine readable storage medium. Any machine readable transmission medium may carry the design information. The term "carry" (e.g., a machine readable transmission medium carrying information) thus covers information encoded or modulated into or onto a carrier wave. The set of bits describing the design or a particular of the design are (when embodied in a machine readable storage medium) an article that may be sealed in and out of itself, or used by others for further design or fabrication.

Alternate Embodiments

It will be appreciated that, for other embodiments, a different system configuration may be used. For example, while the system 100 includes a chip multiprocessor system, a computer system including at least one CPU may benefit from the cache partitioning and victim block selection scheme of various embodiments. Further different type of system or different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments of the invention as defined by the following claims.

What is claimed is:

1. A method comprising:
   requesting a requested cache block from system memory if a cache miss within each way of a shared cache is detected according to a received request from a processor core, the shared cache shared by a plurality of processor cores; and
   selecting a victim block to evict from the shared cache according to a processor identifier of the processor core and a request type of the received request from the processor core, to restrict the selection of the victim block to a subset of ways determined according to the processor ID and the request type.

2. The method of claim 1, further comprising:
   evicting the selected victim block from the shared cache;
   providing the requested cache block to the processor; and
   storing the requested cache block within a portion of the shared cache from which the victim block was evicted.

3. The method of claim 1, wherein prior to requesting, the method further compnses:
   (a) partition an M-way set-associative shared cache according to N processors and T memory request types; and
   (b) restricting processor selection of victim blocks to a subset of available ways of the M-way set-associative shared cache according to the partition of (a).

4. The method of claim 1, wherein restricting processor selection of victim blocks comprises:
   (a) selecting a processor;
   (b) selecting a memory request type for the selected processor;
   (c) allocating one or more of the M-ways of the shared cache to the selected memory request type;
   (d) generating an M-bit mask according to the allocated ways of (c);
   (e) generating an entry within a table according to a processor ID of the selected processor and the request type to identify the M-bit mask;
   (f) repeating (b)-(e) for each of the T memory request types; and
   (g) repeating (a)-(f) for each of the N processors.

5. The method of claim 1, wherein selecting further comprises:
   querying a table according to the processor identifier and the request type to identify an M-bit way mask;
   accessing a set of the shared cache according to a cache index of the received request;
   identifying at least one victim block from the set according to at least one set bit of the M-bit way mask; and
   evicting the identified victim block.

6. An article of manufacture including a machine readable storage medium having stored thereon instructions which may be used to program a system to perform a method, comprising:
   requesting a requested cache block from system memory if a cache miss within each way of a shared cache is detected according to a received request from a processor core, the share cache shared by a plurality of processor cores; and
   selecting a victim block to evict from the shared cache according to a processor identifier (ID) of the processor core and a request type of the received request from the processor core to the restrict selection of the victim block to a subset of ways determined according to the processor ID and the request type.

7. The article of manufacture of claim 6, further comprising:
   evicting the selected victim block from the shared cache;
   providing the requested cache block to the processor; and
   storing the requested cache block within a portion of the shared cache from which the victim block was evicted.

8. The article of manufacture of claim 6, wherein prior to requesting, the method further comprises:
   (a) partition an M-way set-associative shared cache according to N processors and T memory request types; and
   (b) restricting processor selection of victim blocks to a subset of available ways of the M-way set-associative shared cache according to the partition of (a).

9. The article of manufacture of claim 6, wherein restricting processor selection of victim blocks comprises:
   (a) selecting a processor;
   (b) selecting a memory request type for the selected processor;
   (c) allocating one or more of the M-ways of the shared cache to the selected memory request type;
   (d) generating an M-bit mask according to the allocated ways of (c);
   (e) generating an entry within a table according to a processor identifier of the selected processor and the request type to identify the M-bit mask;
   (f) repeating (b)-(e) for each of the T memory request types; and
   (g) repeating (a)-(f) for each of the N processors.

10. The article of manufacture of claim 6, wherein selecting further comprises:
    querying a table according to the processor identifier and the request type to identify an M-bit way mask;
    accessing a set of the shared cache according to an index of the received request;
    identifying at least one victim block from the set according to at least one set bit of the M-bit way mask; and
    evicting the identified victim block.

11. A method comprising:
    checking each way of a shared cache according to a received request to determine whether a requested cache block is stored therein, the shared cache shared by a plurality of processor cores; and
    evicting a selected victim block from the shared cache according to a requestor identifier of the processor core and a request type of the received request from the processor core if a cache miss of the requested cache block is detected to restrict eviction of the selected victim block to a subset of ways determined according to the processor ID and the recluest type.

12. The method of claim 11, wherein prior to checking the shared cache, the method further comprises:
    (a) selecting a requestor;
    (b) selecting a memory request type for the selected requestor;
    (c) allocating one or more of the M-ways of the shared cache to the selected memory request type;
    (d) generating an M-bit mask according to the allocated ways of (c);

(e) generating an entry within a table according to a requestor identifier of the selected requestor and the request type to identify the M-bit mask;
(f) repeating (b)-(e) for each of T memory request types; and
(g) repeating (a)-(f) for each of N requestors.

13. The method of claim 11, wherein evicting the selected victim block comprises:
querying a table according to a processor identifier and the request type to identify an M-bit way mask, wherein each set bit within the M-bit way mask identifies a candidate victim block at a set of the shared cache indicated by an index of the received request.

14. The method of claim 13, wherein querying further comprises:
selecting one of a least recently used way, a most recently used way and a random way as the selected victim block if at least two bits of the M-bit mask are set.

15. The method of claim 11, further comprising:
requesting a cache block from system memory if a cache miss within the shared cache is detected according to a received request from a processor;
providing the requested cache block to the processor; and
storing the requested cache block within a portion of the shared cache from which the victim block was evicted.

16. An article of manufacture including a machine readable storage medium having stored thereon instructions which may be used to program a system to perform a method, comprising:
checking each way of a shared cache to determine whether a requested cache block is stored therein according to a received request from a processor core, the shared cache shared by a plurality of processor cores; and
evicting a selected victim block from the shared cache according to a requestor identifier of the processor core and a request type of the received request from the processor core if a cache miss of the requested cache block is detected to restrict eviction of the selected victim block to a subset of ways determined according to the processor ID and the request type.

17. The article of manufacture of claim 16, wherein prior to checking the shared cache, the method further comprises:
(a) selecting a requestor;
(b) selecting a memory request type for the selected requestor;
(c) allocating one or more of the M-ways of the shared cache to the selected memory request type;
(d) generating an M-bit mask according to the allocated ways of (c);
(e) generating an entry within a table according to a requestor identifier of the selected requestor and the request type to identify the M-bit mask;
(f) repeating (b)-(e) for each of T memory request types; and
(g) repeating (a)-(f) for each of N requestors.

18. The article of manufacture of claim 16, wherein evicting the selected victim block comprises:
querying a table according to a processor identifier and the request type to identify an M-bit way mask, wherein each set bit within the M-bit way mask identifies a candidate victim block at a set of the shared cache indicated by an index of the received request.

19. The article of manufacture of claim 18, wherein querying further comprises:
selecting one of a least recently used way, a most recently used way and a random way as the selected victim block if at least two bits of the M-bit mask are set.

20. The article of manufacture of claim 16, further comprising:
requesting a cache block from system memory if a cache miss within the shared cache is detected according to a received request from a processor;
providing the requested cache block to the processor; and
storing the requested cache block within a portion of the shared cache from which the victim block was evicted.

21. An apparatus, comprising:
a controller to request a requested block from system memory if a cache miss of the requested block is detected from each way of a shared cache according to a received request from a processor core, the cache shared by a plurality of processor cores, and to select a victim block to evict from the shared cache according to a requestor identifier of the processor core and the request type of a received request from the processor core to restrict the selection of the victim block to a subset of ways determined according to the processor ID and the reciuest type.

22. The apparatus of claim 21, wherein the controller further comprises:
victim block candidate logic to query a table according to the requestor identifier and the request type to identify an M-bit way mask, wherein each set bit within the M-bit way mask identifies a candidate victim block at a set of the shared cache indicated by a cache index of the received request.

23. The apparatus of claim 21, wherein the controller further comprises:
cache partition logic to partition an M-way set-associative shared cache according to N processors and T memory request types, and to restrict selection of victim blocks to a subset of available ways of the M-way set-associative shared cache.

24. The apparatus of claim 21, wherein the controller further comprises:
replacement logic to access a set of the shared cache according to a cache index of the received request, to identify at least one victim block from the set according to at least one set bit of the M-bit way mask, and to evict the identified victim block.

25. The apparatus of claim 24, wherein the replacement logic is further to select one of a least recently used way, a most recently used way and a random way as the selected victim block if at least two bits of the M-bit mask are set.

26. A system comprising:
a system memory coupled to an interconnection network;
a chip multi-processor (CMP) comprising a plurality of processor cores coupled to the inter-connection network; and
a shared cache coupled to the interconnection network, the shared cache including a cache partition logic to direct a cache controller to request a cache block from the system memory if a cache miss of the cache block within each way of the shared cache is detected in response to a received request from a processor core of the plurality of processors and to select a victim block to evict from the shared cache according to a processor identifier (ID) of the processor core and a request type of the received request from the processor core of the CMP to restrict the selection of the victim block to a subset of ways detennined according to the processor ID and the reciuest type.

27. The system of claim 26, wherein the system memory comprises RDRAM.

28. The system of claim 26, wherein the cache partition logic further comprises:

victim block candidate logic to query a table according to the processor identifier and the request type to identify an M-bit way mask, wherein each set bit within the M-bit way mask identifies a candidate victim block at a set of the shared cache indicated by a cache index of the received request.

29. The system of claim 26, wherein the shared partition logic further comprises:

replacement logic to access a set of the shared cache according to a cache index of the received request, to identify at least one victim block from the set according to at least one set bit of the M-bit way mask, and to evict the identified victim block.

30. The system of claim 29, wherein the replacement logic is further to select one of a least recently used way, a most recently used way and a random way as the selected victim block if at least two bits of the M-bit mask are set.

* * * * *

UNITED STATES PATENT AND TRADEMARK OFFICE
CERTIFICATE OF CORRECTION

| | | |
|---|---|---|
| PATENT NO. | : 7,558,920 B2 | Page 1 of 1 |
| APPLICATION NO. | : 10/882048 | |
| DATED | : July 7, 2009 | |
| INVENTOR(S) | : Mattina et al. | |

It is certified that error appears in the above-identified patent and that said Letters Patent is hereby corrected as shown below:

In column 8, at line 57 delete, "recluest" and insert -- request --.

In column 10, at line 20 delete, "reciuest" and insert -- request --.

In column 10, at line 64 delete, "detennined" and insert -- determined --.

In column 10, at line 64 delete, "reciuest" and insert -- request --.

Signed and Sealed this

Twenty-fourth Day of August, 2010

David J. Kappos
*Director of the United States Patent and Trademark Office*